United States Patent
Sawert et al.

[11] Patent Number: 6,021,668
[45] Date of Patent: *Feb. 8, 2000

[54] INDICATOR SYSTEM

[75] Inventors: Ulf Sawert, Grand Blanc; Hugh Wesley Ireland, Swartz Creek; Timothy Francis Coha, Burton, all of Mich.

[73] Assignee: General Motors Corporation, Detroit, Mich.

[ * ] Notice: This patent is subject to a terminal disclaimer.

[21] Appl. No.: 08/972,290

[22] Filed: Nov. 18, 1997

Related U.S. Application Data

[62] Division of application No. 08/594,889, Feb. 9, 1996, Pat. No. 5,746,088.

[51] Int. Cl.$^7$ ............................. G01F 23/36; H01C 10/08
[52] U.S. Cl. ................................. 73/313; 338/92
[58] Field of Search ................................ 338/33, 92, 93, 338/96, 162, 167, 195; 73/313, 317

[56] References Cited

U.S. PATENT DOCUMENTS

| | | | |
|---|---|---|---|
| 4,931,764 | 6/1990 | Gaston | 338/185 |
| 5,746,088 | 5/1998 | Sawert et al. | 73/317 |

FOREIGN PATENT DOCUMENTS

| | | |
|---|---|---|
| 0023949 | 2/1981 | European Pat. Off. . |
| 0310467 | 4/1989 | European Pat. Off. . |
| 2589617 | 5/1987 | France . |
| 2083710 | 3/1982 | United Kingdom . |

OTHER PUBLICATIONS

European Search Report—EP 97 20 3877 corres to USSN 08/972,290 dated Mar. 4, 1998.

Riley, "Silver–in–Glass Technology for Ruggedized Digital Encoders", Three page article from Dec. 1996 issue of Sensors magazine.

*Primary Examiner*—Hezron Williams
*Assistant Examiner*—Willie Morris Worth
*Attorney, Agent, or Firm*—Vincent A. Cichosz

[57] ABSTRACT

This invention includes a combustion engine fuel level indication system operable at 10 mA or lower and without any contact resistance buildup. The present system utilizes a noble metal ink formulation for both contacts of resistive path and a conductive path. The resistive and conductive paths each having angled conductor lines which reduce the overall volume requirement for the noble metal ink composition used to make the paths. The invention also includes a wiper contact having spaced apart parallel tangs or fingers positioned so that a first finger engages a first conductor line along the conductive path and a second finger engages an adjacent conductor line along the conductive path to improve the make brake contact.

2 Claims, 3 Drawing Sheets

INDICATOR SYSTEM

This is a division of application Ser. No. 08/594,889 filed on Feb. 9, 1996, now U.S. Pat. No. 5,746,088.

FIELD OF THE INVENTION

This invention relates to ceramic resistor card assemblies in fuel level indicator systems.

BACKGROUND OF THE INVENTION

Ceramic resistor card assemblies have been utilized in fuel level indication systems heretofore. The ceramic material and the inks printed thereon are stable when exposed to harsh elements within a gasoline fuel tank. There are several standard designs.

In a first standard design, contacts located on a wiper assembly form a shorting bar across a resistor on the ceramic card and a conductor on the ceramic card. A prior art ceramic resistor card 10 is shown in FIG. 1. A wiper button makes contact at designated intervals with conductive bars 12 emanating from a resistive ink 14 printed over the conductive bars. A second wiper button rides on a flat continuous conductive path 16 screened onto the ceramic substrate. An alloy of copper, zinc and nickel known as "silver nickel" is used as a material for the contacts due to the relative softness of this material and its relative low cost. Substantial material volume must be utilized to allow for the significant contact wear to insure part durability.

In a second standard design, contacts located on the wiper assembly form a shorting bar across a resistor on a ceramic card and a metal conductor plate. The wiper contact button makes contact at designated intervals with conductive bars emanating from underneath the resistor ink. The second contact button rides on the metal plate.

Both of these standard designs are susceptible to the buildup of contact resistance. Contact resistance can change the output value of the resistor assembly or in some instances can cause "open circuit" conditions. "Silver nickel" has a tendency to oxidize under environmental conditions found in today's gasoline fuel tanks, and with an increased use of oxygenated fuels. To overcome contact resistance, many designs rely on voltage in the circuit and the "scrubbing" action of the contacts riding across the surface they wipe on. "Scrubbing" is mechanical abrasion, which is the interaction of the contact surfaces and the force with which the contacts are held against the surfaces. With the designs described above, relatively high forces in the 20 to 40 gram range are used to cause abrasion or wear against the ink/ceramic surface or the metal contact plate. Contact wear is further aggravated by the presence of the fuel. The fuel washes the abrasive surfaces, thereby "renewing" the cutting surfaces of the abrasives in the ceramics and the inks. In contrast, the contact wear under dry conditions creates "smooth" surfaces as surface irregularities are filled in with abraded material. "Burn through" is achieved when sufficient voltage is applied to the circuit to overcome the contact resistance. The designs described above require a voltage which can produce 25 mA to overcome contact resistance on a consistent basis.

The change in electro-mechanical gauges to electronic modules for the display of fuel levels has reduced the voltage provided to the variable resistor from 13.5 volts to 5 volts. Pull-up resistors used in these electronic modules or computers further decrease the voltage so that only 10 mA are available. Since the designs described above require 25 mA to consistently override resistance they cannot be used in these electronic systems.

2

The recent implementation of onboard diagnostic evaporative emission requirements force the fuel indication system to be more accurate. Any problems resulting from contact resistance may jeopardize the accuracy of the systems and their ability to meet onboard diagnostic requirements.

The present invention provides advantages over the prior art.

SUMMARY OF THE INVENTION

This invention includes a combustion engine fuel level indication system operable at 10 mA or lower and without any contact resistance buildup. The present system utilizes a noble metal ink formulation for contacts of an arcuate shaped resistive path or conductive path. The contact bar and resistive layer each have angled conductor lines which reduce the overall volume requirement for the noble metal ink composition. Further, the invention includes a wiper contact having at least two spaced apart parallel tangs or fingers positioned so that a first finger engages a first conductor line along the contact bar and the third finger engages an adjacent conductor line along either the contact bar or resistive path to improve the make brake contact.

These and other objects, features and advantages will become apparent from the following brief description of the drawings, detailed description and appended claims and drawings.

DETAILED DESCRIPTION

Figure 1:
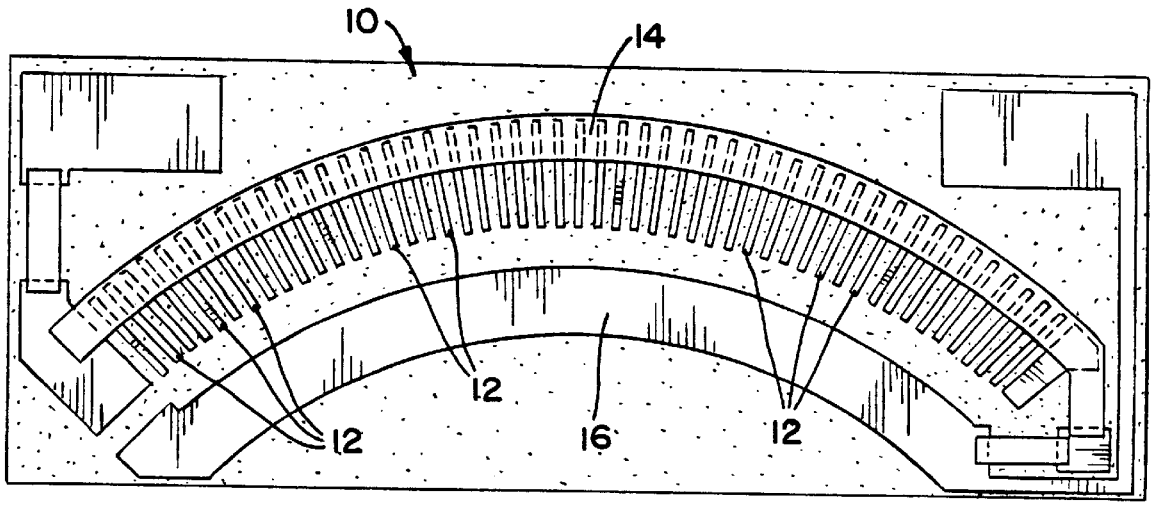
FIG. 1 is an illustration of a prior art ceramic resistor card for a fuel level indication system.
Figure 3:
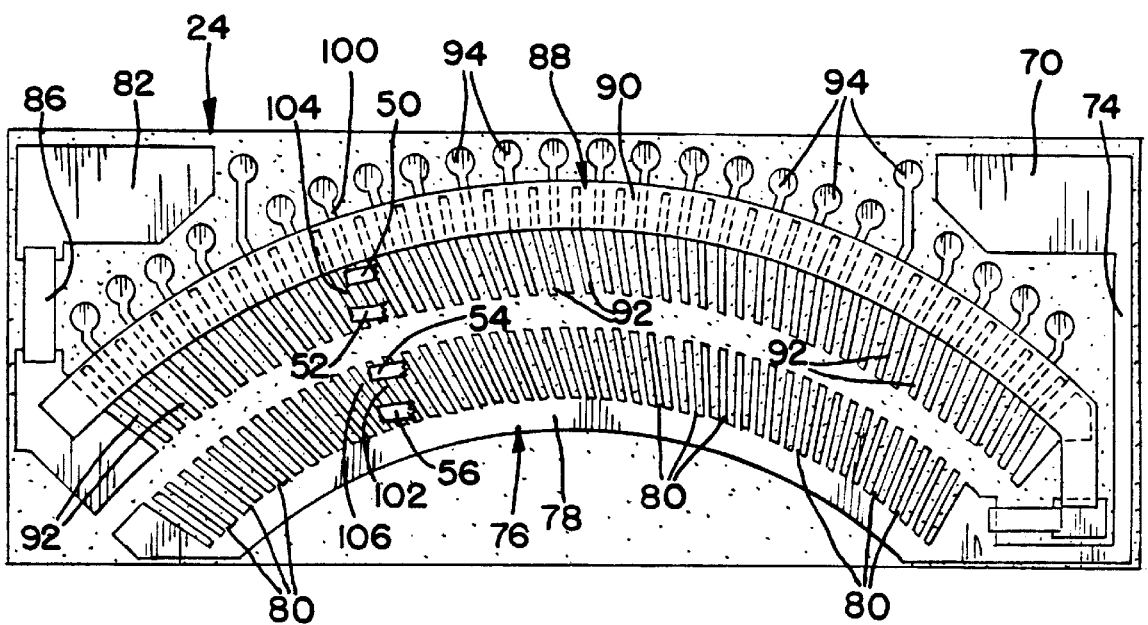
FIG. 3 is an enlarged view of a ceramic resistor card for a fuel level indication system of FIG. 2 as viewed in the direction of arrows 3—3.
Figure 2:
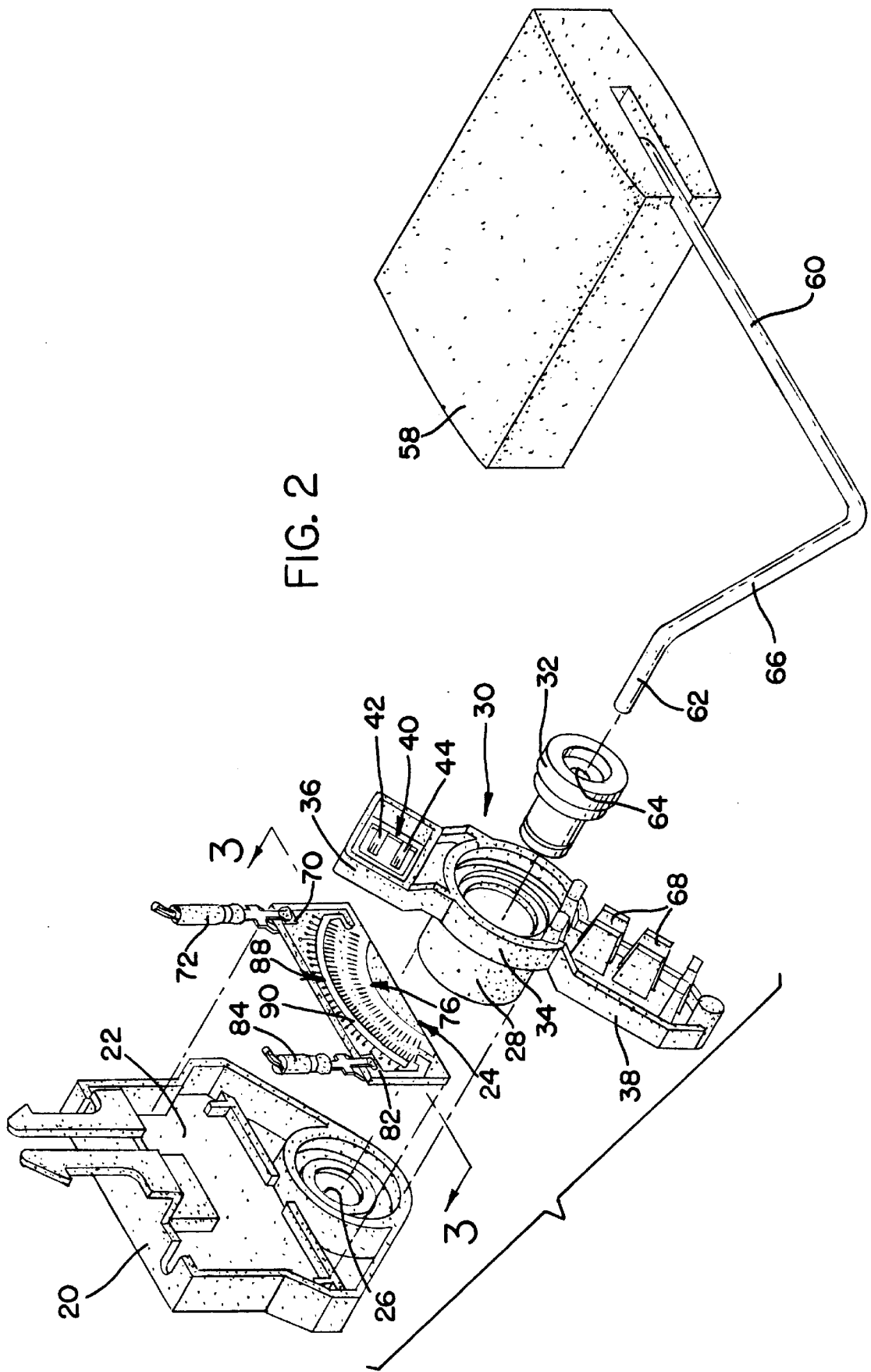
FIG. 2 is an exploded view of a fuel level indication system according to the present invention.
Figure 4:
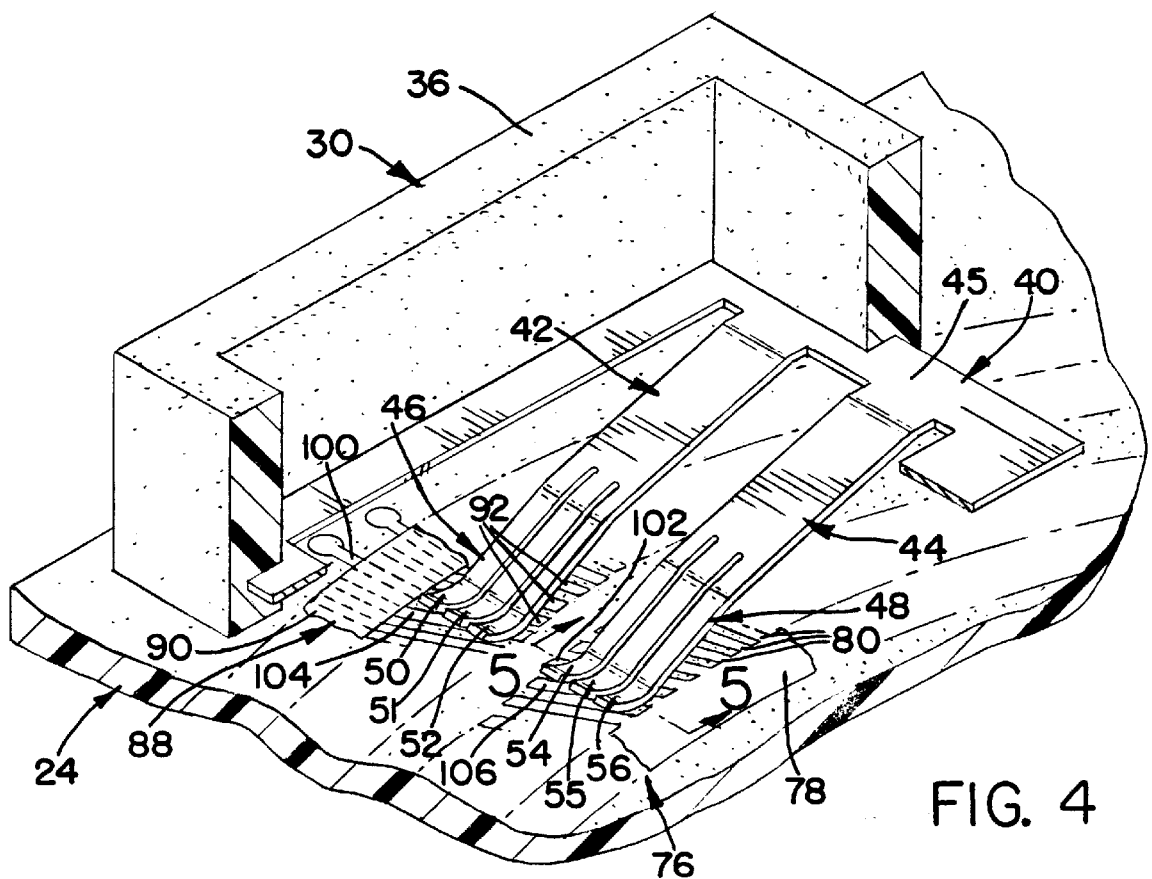
FIG. 4 is an enlarged view of a contact assembly according to the present invention.
Figure 5:
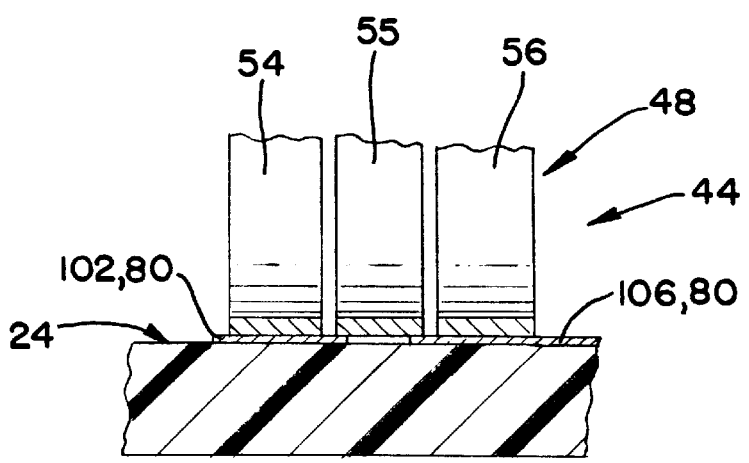
FIG. 5 is a cross-sectional view of a portion of FIG. 4 as indicated by line 5—5.

FIG. 2 illustrates a combustion fuel level indicator system according to the present invention. The fuel level indicator system includes a housing 20 having a recess 22 therein for carrying a resistor card 24. The housing 20 also has a recess or hole 26 therein for a hollow male portion 28 of a wiper assembly 30. The wiper assembly 30 is pivotally connected to the housing with the aid of a bushing 32 which extends through the hollow male portion 28. The wiper assembly includes a body portion 34 from which the hollow male portion 28 extends, an upper head portion 36 and a lower leg portion 38. The upper head portion carries a contact assembly 40 including a pair of spaced apart parallel arms 42, 44 connected together by a bridge 45. Each arm 42, 44 has a set of fingers 46, 48, preferably three, of spaced apart outwardly extending parallel fingers 50, 51, 52 and 54, 55, 56. Both sets of fingers 46, 48 are positioned to travel in an arc-shaped path consistent with the arc-shaped resistive path 88 or arc-shaped conductive path 76 on the ceramic card as described hereafter.

A float 58 is provided for vertical movement in a fuel tank and a lever 60 extends therefrom for engagement in the bushing. The lever extending from the float includes a head portion 62 which extends into a hole 64 in the bushing 32, and a downwardly extending body portion 66 which is captured by prongs 68 extending outwardly from the leg portion 38 of the wiper assembly. As the float moves up and down due to the changes in fuel level, the lever extending therefrom causes the wiper assembly to rotate.

The resistive card includes a first contact pad 70 having a first wire 72 connected thereto to provide current to the contact pad. A conductive line 74 extends along one edge of the resistive card from the first contact pad 70 to an arc-shaped conductive path 76. The arc-shaped conductive path 76 includes an arc-shaped continuously solid base portion 78 and a plurality of spaced apart conductor lines 80 extending therefrom at an angle with respect to a radial line drawn from the center of the base portion's arc. A second contact pad 82 is provided having a second wire 84 secured thereto. A conductive line 86 extends along an opposite side of the resistive card from the second conductor pad to an arc-shaped resistive path 88. The arc-shaped resistive path includes an arc-shaped resistive ink pattern 90 overlying a plurality of spaced apart conductor lines 92 formed at a radial line drawn from the center of the resistive ink pattern's arc. A plurality of small contact pads 94 extend from the selective conductor lines 92 of the resistive path for purposes of laser trimming the resistive path.

As the float 58 moves up and down with respect to changing fuel levels, the lever 60 extending from the float causes the wiper assembly 30 to rotate. As the head 36 portion of the wiper assembly rotates, the first set of tangs or fingers 46 on the first contact arm 42 engage the conductor lines 92 of the resistive path 88 and the second set of tangs or fingers 48 on the second contact arm 44 engage the conductor lines 80 of the arc-shaped conductive path 76. With respect to both the resistive path 88 and conductive path 76, a top finger 50, 54 of the contact arm 42, 44 will engage one of the conductor lines 100, 102 and a third finger 52, 56 (parallel to the first finger) on the same arm will contact an adjacent conductor line 104, 106 respectively. Thus, because the conductor lines 80, 92 are formed at an angle with respect to a radial line drawn from the center of the arc of the resistive pattern or conductive base portion respectively, and the fingers 50 and 52, 54 and 56 on each arm are parallel, the contact arm is simultaneously contacting adjacent conductor lines thus minimizing or eliminating any problem associated with make brake contact of prior art resistor cards. Preferably, each set of fingers 46, 48 are curled so that the finger can move smooth over the elevated conductor lines 80, 92. The fingers 50–56 of a contact are made from an alloy including preferably 45% of palladium and/or platium, 38% silver and 17% copper by weight. A suitable alloy is available from Ney Corporation under the tradename PALINEY® 6. The fingers are 3/1000 of an inch thick or less. These high content precious metal contacts are extremely resistant to oxidation allowing the system to operate at 10 mA.

Preferably the conductor lines 80, 92 of both the resistive path and the conductive path are formed from a conductive ink composition comprising at least 35 weight percent silver and up to 65 weight percent silver. A suitable conductive ink composition is available from Heraeus company.

Because spaced apart conductor lines are used for each path, the wiper contact assembly 40 wears less. This is because the sets of contact fingers 46, 48 come in contact with less material during the wiping operation. Further, since the conductive path 76 is made from a ink containing a relatively high concentration of noble metals, the use of spaced apart conductor lines reduces the cost of the resistor card compared to a continuous wide solid conductor line or path of the prior art. It is also believed that the conductive path's ink having a relatively high concentration of silver allows silver to migrate to the surface. The silver on the surface of the conductive path provides a "softer" more ductile surface for the contacts to ride on and thus reduces the wear of the contact assembly 40.

In operation, current is provided through a wire 72 to the first contact pad 70 and flows therefrom to the conductive path 74 printed on the resistor card. The set of fingers 48 on the second arm 44 of the contact wiper assembly engage at least two of the conductor lines 102, 106 on the conductive path 76. The current then flows across the contact 40 through the first arm 42 and first set of fingers 46 to at least two conductor lines 100, 104 on the resistive path 88. As the fuel float 58 moves with the fuel level, the wiper assembly rotates along the conductive and resistive paths. Consequently, a variable resistance to current is provided dependent upon where the contact engages the resistive path. As a result, the present fuel level indicator system can be operated at 10 mA or lower versus at least 25 mA in the prior art.

What is claimed is:

1. A product comprising:

a resistive card having an arc shaped resistive path comprising a first set of spaced apart parallel connector lines and an arc-shaped resistive ink material overlying said first set of conductor lines, said parallel connector lines being formed at an angle with respect to a radial line drawn from the center of the resistive path arc; and an arc-shaped conductive path comprising an arc-shaped continuously solid conductor base and a second set of spaced apart parallel conductor lines extending from said base at an angle with respect to the radial line drawn from the center of the arc-shaped conductor base.

2. A product as set forth in claim 1 further comprising:

a wiper assembly having a pair of spaced apart arms, each arm having a plurality of parallel fingers extending from one end and constructed and arranged so that one of said fingers on a first arm engages a conductor line on the resistive path and a second finger on said first arm engages an adjacent conductor line along said resistive path; and a first finger on said second arm engages a conductor line on said conductive path; and a second finger engaging an adjacent conductor line on said conductive path, said wiper assembly being constructed and arranged to provide rotational movement along the arc-shaped conductive path and arc-shaped resistive path.

\* \* \* \* \*